July 4, 1933.  C. SCHLABURG  1,916,937
SLACK TAKE-UP FOR ELECTRIC CONDUCTOR CORDS
Filed Dec. 27, 1929
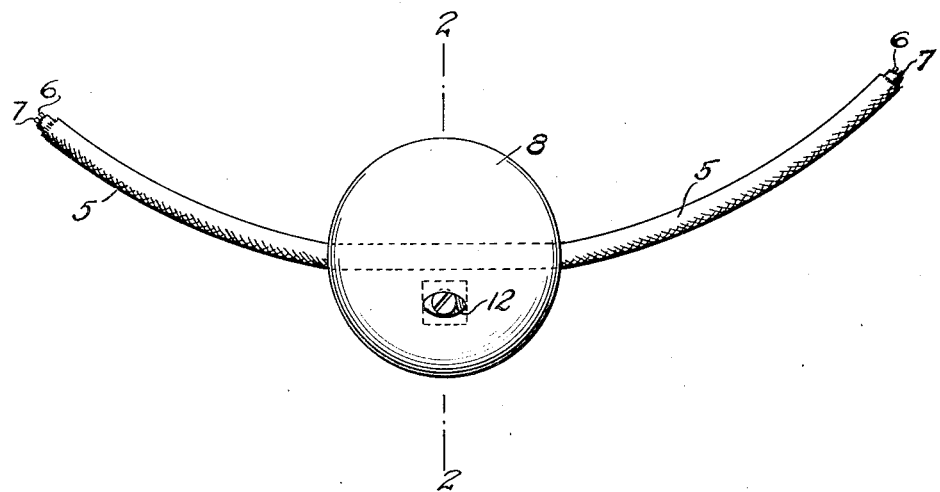
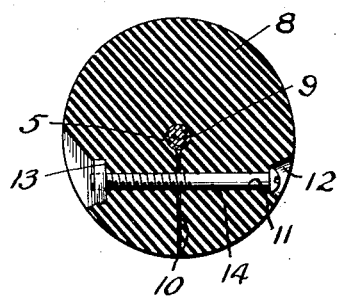
Inventor
Charles Schlaburg Patented July 4, 1933

1,916,937

UNITED STATES PATENT OFFICE

CHARLES SCHLABURG, OF AKRON, OHIO

SLACK TAKE-UP FOR ELECTRIC CONDUCTOR CORDS

Application filed December 27, 1929. Serial No. 417,010.

This invention relates to electric conductor cords and to improved means for taking up slack in said cords while the same are in use.

While intended for use generally wherever it may be advantageously applied, the invention is particularly designed for use in connection with a conductor cord of an electrically operated flat iron.

It is well known that the conductor cord on electric flat irons causes considerable annoyance when the same is in use, as the portion of the cord adjacent the iron remains on the ironing board or table and interferes with the proper manipulation of the iron.

Many spring operated devices have been designed to take up slack in the cord and maintain the same in a relatively taut condition. These devices have been relatively complicated and generally unsatisfactory.

It is an object of this invention to provide simple, inexpensive means for taking up the slack in such cords while the same are operatively attached to an electrically heated or operated device.

A further object is to provide a slack take-up attachment for electric cords which may be quickly and conveniently attached in an operative position thereon and which will not interfere with the free movement of the flat iron or other electrically operated device.

An additional object is to provide a weight of soft flexible rubber having a bore extending therethrough to receive an electric conductor cord whereby the same will be yieldably held on the cord by the inherent nature of the material whereby the same may be conveniently moved to any desired position on the cord and held in a relatively fixed position by the binding action of the material.

A still further object is to provide a weight of the class above indicated which may be positioned on an electric conductor without removing the terminal connection.

The above objects are accomplished and additional ends are attained by the novel construction, combination and arrangement of parts hereinafter described and illustrated in the accompanying drawing, wherein I have shown a preferred form of the invention, it being understood that the invention is capable of various adaptations and that changes and modifications may be made or resort had to substitutions which come within the scope of the claims hereunto appended.

In the drawing like characters of reference are employed to denote like parts as the same may appear in any of the several views and in which:—

Figure 1 is a side elevational view of a portion of an electric conductor cord having a slack take-up device constructed in accordance with this invention operatively attached thereto, Figure 2 is a cross sectional view of same taken as indicated by the lines 2—2 of Figure 1.

Proceeding now to a detailed description of the invention with reference to the particular adaptation thereof disclosed in the drawing, the numeral 5 is used generally to denote an electric conductor cord which consists of insulated conductor wires 6 and 7, covered with a flexible protecting sheath.

The numeral 8 denotes a weight which in the adaptation of the invention illustrated is in the form of a sphere having a bore 9 extending diametrically therethrough. The sphere 8 is preferably composed of relatively soft elastic rubber and the bore 9 is adapted to snugly receive the cord 5. The bore 9 is preferably formed of a diameter smaller than the diameter of the cord on which it is to be used whereby the walls of the bore 9 will yield to receive the cord 5 and the inherent elasticity of the material will yieldably hold the sphere 8 in a relatively fixed position thereon. While a sphere composed of elastic material having a bore extending therethrough will form a completed device, in the drawing I have shown a sphere having a radial cut 10 extending from one side thereof to the bore 9 whereby the walls of the cut 10 may be spread apart and a cord 5 entered into the bore 9 without removing the terminal connections ordinarily attached to an electric conductor cord.

A second bore 11 extends through the sphere 8 in spaced relation to the bore 9 at a right angle thereto on a cord intersecting the cut 10 at a right angle. The bore 11 is enlarged at each end to form the seats 12 and 13 which are adapted to receive the head and nut of a bolt 14 which is operatively positioned in the bore 11 to hold the cut 10 in a closed position.

In use, the sphere 8 is positioned on a conductor cord for a flat iron or other electrically operated device at a point which will be positioned between the table on which it is used and the terminal socket to which it is connected. The sphere 8 forms a weight which will at all times exert a pull on the cord 5 and take up the slack of the portion thereof which is positioned on the table adjacent the electrically operated device.

When the cut 10 and the bore 11 are omitted the sphere 8 is positioned on the conductor cord by threading the cord through the bore 9. If desired a tapered tube may be forced through the bore 9 to employ the same, the cord 5 placed through the tube and the tube withdrawn leaving the cord 5 positioned in the bore 9.

Having thus illustrated my invention and described the same in detail, what I claim as new and desire to secure by Letters Patent is:—

1. In a device of the character described, a spherical body of relatively soft elastic rubber, said body having a bore extending diametrically therethrough and having a radial cut disposed longitudinally of said bore and extending from one side thereof to said bore, the walls of said cut adapted to be forced apart to position the body on a cord and means operable to close said cut and hold the same in a closed position.

2. In a device of the character described, a spherical body of relatively soft elastic rubber, said body having a bore extending diametrically therethrough and having a radial cut disposed longitudinally of said bore and extending from one side thereof to said bore, the walls of said cut adapted to be forced apart to position the body on a cord, said body having a bore extending therethrough transversely of said cut and a bolt positioned in the last named bore said bolt operable to hold said cut in a closed position.

In testimony whereof, I have hereunto set my hand.

CHARLES SCHLABURG.